United States Patent
Olds et al.

[11] Patent Number: 5,996,617
[45] Date of Patent: Dec. 7, 1999

[54] LOW PRESSURE REGULATOR

[75] Inventors: Charles M. Olds, Anna; John D. Hostutler, Princeton, both of Tex.

[73] Assignee: Fisher Controls Internationals Inc., Clayton, Mo.

[21] Appl. No.: 09/054,273

[22] Filed: Apr. 2, 1998

Related U.S. Application Data

[62] Division of application No. 08/414,524, Mar. 31, 1995, Pat. No. 5,740,833.

[51] Int. Cl.$^6$ .................................................. G05D 16/06
[52] U.S. Cl. ................................ 137/505.46; 137/505.12
[58] Field of Search ....................... 137/505.46, 505.47, 137/505.12

[56] References Cited

U.S. PATENT DOCUMENTS

| | | |
|---|---|---|
| 239,573 | 3/1881 | Thomas . |
| 593,091 | 11/1897 | Foster . |
| 1,819,288 | 8/1931 | Groble ........................... 137/505.47 X |
| 1,837,233 | 12/1931 | Rumpf . |
| 1,946,188 | 4/1934 | Birch . |
| 1,949,106 | 2/1934 | Manneschmidt, Jr. . |
| 2,015,930 | 10/1935 | Groble ........................... 137/505.46 X |
| 2,775,981 | 1/1957 | Zonker . |
| 2,896,599 | 7/1959 | Ensign . |
| 2,952,272 | 9/1960 | Hansen . |
| 3,268,216 | 8/1966 | Phillips ........................... 137/505.47 X |
| 3,339,581 | 9/1967 | Courtot ............................ 137/505.46 |
| 3,630,652 | 12/1971 | Nutter ............................. 137/505.46 X |
| 4,630,641 | 12/1986 | Lacour . |
| 4,802,507 | 2/1989 | Willson . |
| 5,103,861 | 4/1992 | Lin . |
| 5,131,425 | 7/1992 | Sturgis . |

FOREIGN PATENT DOCUMENTS

| | | |
|---|---|---|
| 0 105 959 B1 | 1/1987 | European Pat. Off. . |
| 0 499 507 A2 | 8/1992 | European Pat. Off. . |
| 38 13 962 A1 | 11/1989 | Germany . |
| WO 95/31760 | 11/1995 | WIPO . |

OTHER PUBLICATIONS

Fisher Controls Instruction Manual, Gas Pressure Regulator, Type R330.
Fisher Controls Instruction Manual, Gas Pressure Regulator, Type 912.
Marshall Gas Controls Advertising, Gas Pressure Regulator, Model 260.
Marshall Gas Controls Advertising, Gas Pressure Regulator, Model 290.

*Primary Examiner*—Stephen M. Hepperle
*Attorney, Agent, or Firm*—Marshall, O'Toole, Gerstein, Murray & Borun

[57] ABSTRACT

A two stage gas pressure regulator with a body housing having a gas inlet and a gas outlet, and a common interior wall dividing the body housing into two chambers forming two pressure reducing stages. Respective intersecting fluid passageways through the common interior wall communicate the first stage to the second stage and provide a gauge pressure tap on the body housing, the intersecting passageways meeting at an intersection point within the common interior wall. Respective diaphragms are provided for each stage, and a cover has a vent venting the volume defined between the cover and the second stage diaphragm. A small passageway is provided in a common cover wall between the two stages, the small passageway being sized to suitably vent both cover portions above the respective diaphragms through the vent while eliminating overpressurization of the second stage in the event of pressure regulating failure of the first stage. A diaphragm actuated lever arm includes a slotted end with the slot matching a stepped gas flow controlling disc. The disc is stepped to match the lever end slot so as to trap the disc within the lever slotted end. The inlet orifice in one or both of the regulator stages can be formed by casting and without further machining or additional orifice components.

2 Claims, 2 Drawing Sheets

LOW PRESSURE REGULATOR

This is a Divisional of U.S. application Ser. No. 08/414,524, filed Mar. 31, 1995 now U.S. Pat. No. 5,740,833.

This invention relates to gas flow pressure-regulating devices and in particular to a two stage gas pressure regulator capable of regulating and providing a low gas pressure at an outlet port regardless of the gas flow rate demanded from a source of high gas pressure such as a tank of liquified gas.

BACKGROUND OF THE INVENTION

Gas pressure regulators are in increasing demand nowadays to safely regulate and maintain the rate of flow of gas within prescribed limits and to maintain the output gas pressure below a desired maximum level. Generally, such presently available gas regulators have included die cast body and spring case components which are then machined such as by drilling in secondary operations. Typically, an inlet orifice must be machined in the regulator body to reliably cooperate with a pivoting lever actuated by a spring backed diaphragm to control the inlet of gas to a pressure reducing chamber.

In such presently available two stage regulators, two input orifices must be drilled and machined and further machining is required to communicate the first stage output to the second stage input. A gauge pressure tap also must be machined and venting must be provided to each regulator stage.

It is desirable to provide a gas pressure regulator which can be manufactured with most of the components by die casting and with only a small amount of secondary operations required to complete the final device.

SUMMARY OF THE INVENTION

In accordance with the principles of the present invention, there is provided a gas pressure regulator having its components configured and positioned so as to facilitate manufacture of the components by die casting and with a minimum of secondary operations required. In particular, in a two stage gas pressure regulator having a body housing with a first pressure reduction stage and a second pressure reduction stage, a common interior wall is formed between the two stages. Respective intersecting fluid passageways through the common interior wall fluidly couple the output of the first stage to the input of the second stage and also provide a gauge pressure tap on the body housing. In this novel configuration, the intersecting passageways meet at a common intersection point and are connected in the common interior wall. Thus, if desired, the intersecting passageways can be provided by die casting the body housing and common interior regulator body wall without requiring any secondary drilling to form the passageways.

The unique two stage gas pressure regulator of the present invention includes respective diaphragms in each of the stages and a cover with a respective first cover portion for sealing the first diaphragm to the common interior wall and a second covered portion for sealing the second diaphragm to the common interior wall. The cover includes a common cover wall at the joint between the first and second cover portions. A small passageway through the common wall fluidly communicates the first cover portion above the first diaphragm and the second cover portion above the second diaphragm. The small passageway is sized to suitably vent both cover portions while eliminating over-pressurization of the second cover portion and the second pressure reduction stage in the event of pressure regulated failure of the first pressure reduction chamber. Accordingly, this shared venting configuration eliminates the need to provide separate respective outlets with each of the stages. Accordingly, fewer parts and assembly operations are needed and therefore a pressure regulator of lower cost is provided. Furthermore, better outdoor protection is provided since venting can normally be provided downwardly under freezing rain conditions.

In accordance with another aspect of the present invention, there is provided a regulator lever with a slotted end locatable over the orifice input. The regulator lever is coupled for activation by a diaphragm. A disc member for controllably closing off the orifice includes a stepped profile wherein one of the stepped portions of the disc matches the slot dimensions at the lever end so that the disc can be trapped and maintained in the lever. This enables the control disc and lever combination to be assembled and maintained without the need for additional parts or retaining operations.

In still another aspect of the present invention, the input orifice is cast into the regulator without requiring any secondary machining or the addition of any parts. Casting of the orifice into the regulator body eliminates the prior required machining operations or additional parts so that the cost of manufacturing of the regulator is substantially reduced.

BRIEF DESCRIPTION OF THE DRAWINGS

The features of the this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
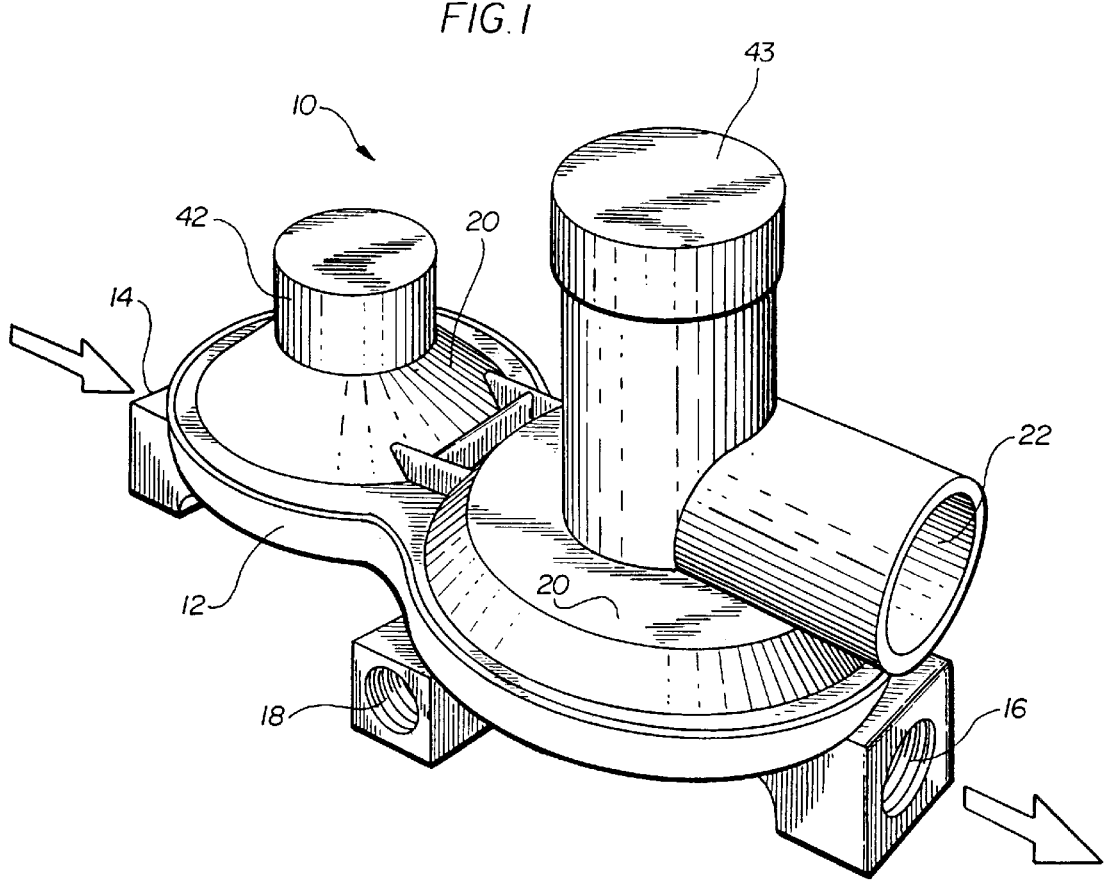
FIG. 1 is a perspective view of a two stage gas pressure regulator constructed in accordance with the principles of the present invention.
Figure 5:
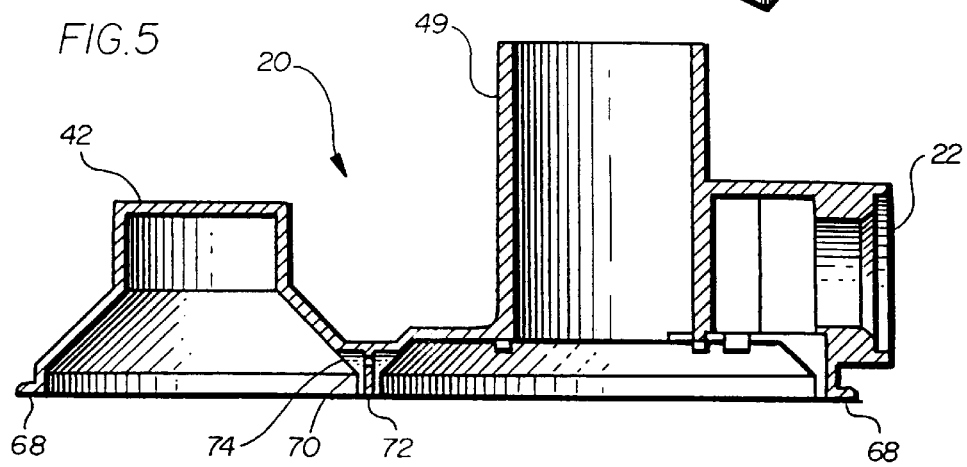
FIG. 5 is a sectional view of the top cover alone taken along section line II—II of FIG. 1.

FIG. 1 illustrates a two stage gas pressure regulator 10 constructed in accordance with the principles of the present invention and including a body 12 having a fluid inlet 14 and a fluid outlet 16. A gas gauge pressure tap 18 is provided for monitoring the pressure at the output of the first stage and at the input of the second stage. A cover 20 includes a vent outlet 22.

In accordance with conventional devices of this type, the inlet 14 of the pressure regulator 10 may be connected to a high pressure gas source such as liquified petroleum gas. The regulator includes two pressure reducing stages. The first pressure reducing stage reduces the pressure of the input 14 and communicates the lower pressure to a second pressure reducing stage for communicating the final reduced pressure to the regulator outlet 16. The pressure at the outlet 16 is maintained below a desired maximum pressure level and the gas flow rate is regulated in accordance with the demand.

Figure 2:
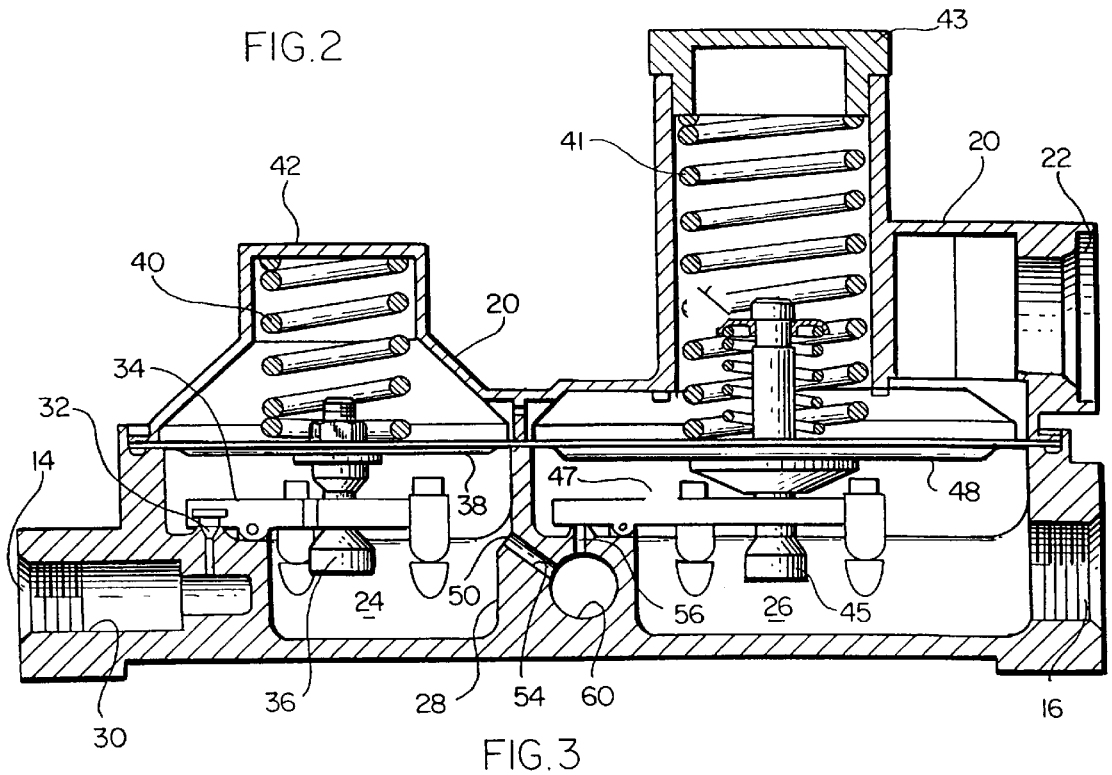
FIG. 2 is a sectional view taken along section lines II—II of FIG. 1.
Figure 3:
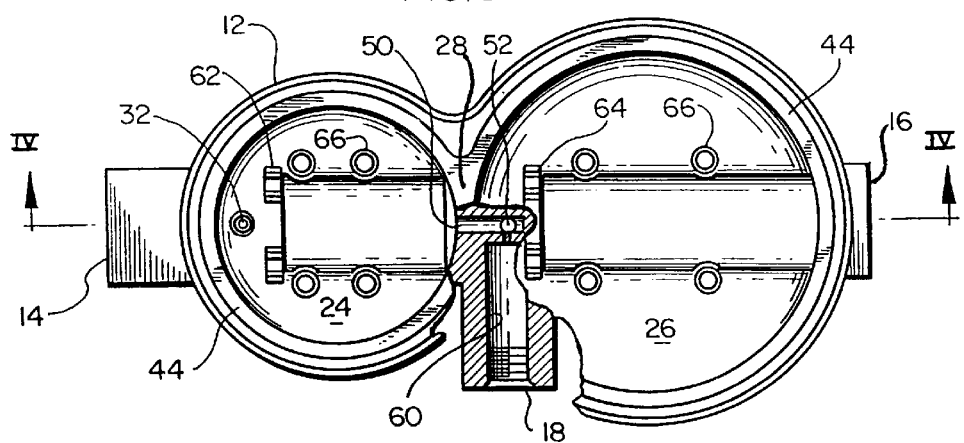
FIG. 3 is a plan view of the regulator body with the diaphragms removed.
Figure 4:
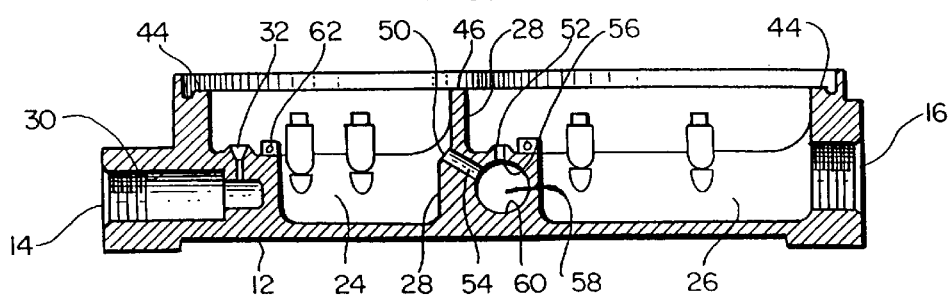
FIG. 4 is a sectional view taken along section lines IV—IV of FIG. 3.

FIGS. 2–4 illustrate the construction details of the regulator 10. Within the body 12, there is provided a first chamber 24 and a second chamber 26 divided by a common interior wall 28 so as to form respective pressure reducing stages within the regulator. In the first pressure reducing stage, the inlet gas is coupled from inlet 14 via a passageway 30 to an inlet orifice 32. The inlet of gas through orifice 32 is controlled by a combination pivoting lever and disc assembly 34 linked to a post 36 which in turn is coupled to a diaphragm 38 sealing off the first chamber 24.

A first stage spring 40 maintained within a spring case portion 42 of the cover 20 maintains the lever/disc assembly 34 in a closed position on the inlet orifice 32 until the downstream gas pressure drops (such as due to a gas appliance turning on) decreasing pressure under diaphragm 38 enough to be overcome by the spring force and thereby allow gas to enter the first chamber 24 in a pressure reduced manner. The first stage diaphragm portion 38 is supported along a perimeter edge 44 of the body 12 and by the top ledge 46 of the common interior wall 28.

The one-piece diaphragm also includes a second diaphragm portion 48 similarly supported on the ledge 44 of the perimeter of housing 12 around the second chamber 26 and is also supported on the top 46 of the wall 28. Accordingly, a first pressure reducing stage defines a first chamber 24 between the first diaphragm portion 38, the body perimeter portion and the interior wall 28. Similarly, the second pressure reducing stage is defined by the chamber 26 between the second diaphragm portion 48, the body perimeter portion and the common interior wall 28. A second stage spring 41 with a spring adjustor 43 acts through a cover plate and diaphragm 48, which in turn is coupled to a post 45 and pivoting second stage lever and disc assembly 47 to control the gas input to the chamber 26.

With reference to FIGS. 3 and 4, there is most clearly illustrated the unique configuration of the present invention wherein the first stage outlet is coupled to the second stage inlet and there is provided a gauge pressure tap 18. A first stage outlet port 50 is provided on the common interior wall 28 and within the first chamber 24. Similarly, an inlet orifice 52 is provided at the top end of the common interior wall within the second chamber 26 and the gas inlet through orifice 52 into the chamber 26 is controlled by the pivoting lever and disc assembly 47. Respective passageways 54, 56 extend respectively from the outlet port 50 and the inlet orifice 52 within the common interior wall and at an angle so as to intersect at an intersection point 58. Longitudinal passageway 60 leads from the gauge pressure tap 18 through the common interior wall to the intersection point 58 so that the outlet port 50, the inlet orifice 52 and the gauge pressure tap 18 are in fluid communication with each other. It is preferred that this configuration of the three passages within the common divided wall 28 can be provided by suitable die casting so that no secondary machine operation is required to form the orifices and passageways. Suitable support brackets 62, 64 are provided as a portion of the body 12 to pivotally support the respective pivoting lever/disc assembly 34 and 47. Several upstanding rods 66 are provided in the body 12 to limit the diaphragm downward movement.

The cover 20 with respective spring case portions 42, 49 includes respective perimeter sealing edge 68 and a common interior wall 70 having a sealing edge 72. Accordingly, as the cover 20 is placed above the diaphragm, the sealing edge 68 lies above the diaphragm and matingly contacts the diaphragm with the corresponding ledge 44 on the perimeter of the body, while the sealing edge 72 of the common interior wall 70 lies over the diaphragm to sealingly engage the top 46 of the wall 28. Within the common wall 70 there is provided a small passageway 74 so that there is a shared vent configuration of the vent 22 between the volume defined by the spring case portion 49 above the second diaphragm portion 48 and the volume defined by the first spring case portion 42 above the first diaphragm portion 38. It is understood that the passageway is sized to suitably provide venting of both cover portions above the respective diaphragms while eliminating the possible overpressurization of the second cover portion and the second pressure reduction chamber in the event of pressure regulated failure of the first pressure reduction chamber.

Figure 6:
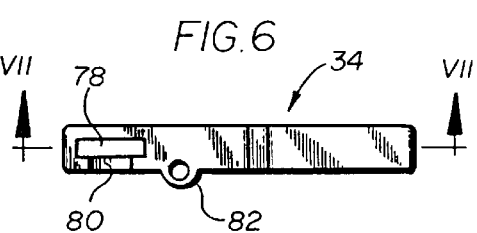
FIG. 6 is an elevational view of the combined regulator and disc.
Figure 7:
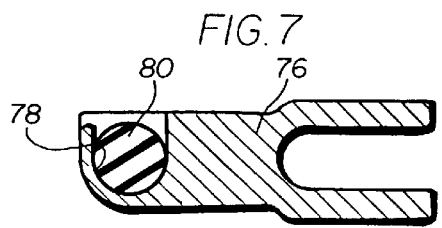
FIG. 7 is a sectional view taken along section line VII—VII of FIG. 6.

Turning now to FIGS. 6 and 7, there is illustrated another aspect of the invention involving the pivoting lever and disc assembly 34 (and also 47 if desired) wherein the lever 76 is provided with a slot 78 matching the disc 80. That is, the disc 80 is comprised of a rubber member for suitably sealing the orifices and includes a stepped profile with one of the steps matching the profile and dimensions of the lever slot 78. Accordingly, the disc can be mounted by sliding one of the matching step profiles within the slot 78 and thereby the disc 80 is trapped within the slot without providing any additional mounting means as normally required to fasten the disc to a lever. A lever pin 82 fits within the bracket 62 or 64 so as to permit the lever and disc assembly 34 to be pivotally operated within the regulator.

The foregoing detailed description has been given for clearness of understanding only, and no unnecessary limitations should be understood therefrom, as modifications will be obvious to those skilled in the art.

It is claimed:

1. In a gas pressure regulator having a diaphragm actuated lever, said lever having a pivoting lever end with a resilient disc member therein for controlling the gas flow through an inlet orifice, the improvement comprising:

said resilient disc member having a one stepped profile;

said one stepped profile defined by an upper base portion of larger outer dimensions than a lower seal portion, said lower seal portion for sealing against said inlet orifice;

said pivoting lever end including a one stepped slot having a matching shape to said one stepped profile of said disc for slidably receiving and trapping the disc in said slot with said base portion above said lower seal portion.

2. The improvement of claim 1, wherein said inlet orifice is formed by casting.

* * * * *